United States Patent
Inoue et al.

(10) Patent No.: US 8,837,442 B2
(45) Date of Patent: Sep. 16, 2014

(54) WIRELESS TRANSMITTER, WIRELESS TRANSMISSION METHOD, WIRELESS RECEIVER AND WIRELESS RECEPTION METHOD

(75) Inventors: Hajime Inoue, Chiba (JP); Keiji Yuzawa, Saitama (JP); Haruhiko Yata, Kanagawa (JP); Shoji Ichiki, Tokyo (JP)

(73) Assignee: Sony Corporation (JP)

( * ) Notice: Subject to any disclaimer, the term of this patent is extended or adjusted under 35 U.S.C. 154(b) by 469 days.

(21) Appl. No.: 12/798,202

(22) Filed: Mar. 31, 2010

(65) Prior Publication Data

US 2010/0265932 A1 Oct. 21, 2010

(30) Foreign Application Priority Data

Apr. 20, 2009 (JP) ................. P2009-101546

(51) Int. Cl.
*H04L 12/28* (2006.01)
*H04L 12/56* (2006.01)
*H04J 3/16* (2006.01)
*H04J 3/22* (2006.01)
*H04J 3/24* (2006.01)
*H04J 3/00* (2006.01)
*H04W 4/00* (2009.01)
*G06F 15/16* (2006.01)

(52) U.S. Cl.
USPC ........... 370/338; 370/389; 370/471; 370/474; 370/476; 709/236

(58) Field of Classification Search
USPC ......... 370/338, 312, 328, 329, 389, 392–394, 370/395.64, 466, 468, 470–477, 486; 709/236, 246, 24; 725/62, 123
See application file for complete search history.

(56) References Cited

U.S. PATENT DOCUMENTS

| | | | | |
|---|---|---|---|---|
| 5,365,272 A | * | 11/1994 | Siracusa | 375/240.25 |
| 5,461,619 A | * | 10/1995 | Citta et al. | 370/468 |
| 5,832,085 A | * | 11/1998 | Inoue et al. | 386/230 |
| 6,335,935 B2 | * | 1/2002 | Kadambi et al. | 370/396 |
| 7,430,617 B2 | * | 9/2008 | Walsh et al. | 709/247 |
| 7,778,281 B2 | * | 8/2010 | Ohta et al. | 370/503 |
| 7,877,514 B2 | * | 1/2011 | Shao et al. | 709/245 |
| 7,961,739 B2 | * | 6/2011 | Perry et al. | 370/397 |
| 2002/0027918 A1 | * | 3/2002 | Burmeister et al. | 370/394 |
| 2002/0103925 A1 | * | 8/2002 | Sheth et al. | 709/236 |

(Continued)

FOREIGN PATENT DOCUMENTS

JP 2007-049242 A 2/2007

OTHER PUBLICATIONS

DOD standard, Internet Protocol, publish date: Jan. 1980 by Information Sciences Institute University of Southern California http://www.networksorcery.com/enp/rfc/rfc760.txt from RFC source book http://www.networksorcery.com/enp/protocol/ip.htm#Publications.*

(Continued)

*Primary Examiner* — Jenee Williams
(74) *Attorney, Agent, or Firm* — Lerner, David, Littenberg, Krumholz & Mentlik, LLP

(57) ABSTRACT

A wireless transmitter which includes: a packetizer which generates a special packet with a payload containing transmitted video signals and a header containing distinguishing information used to distinguish the special packet from an IP packet; and a wireless transmitting section for generating and transmitting wireless radio signals which contain a special packet generated by the packetizer.

12 Claims, 4 Drawing Sheets

(56) References Cited

U.S. PATENT DOCUMENTS

| | | | |
|---|---|---|---|
| 2002/0152467 A1* | 10/2002 | Fiallos | 709/231 |
| 2002/0163908 A1* | 11/2002 | Lakaniemi et al. | 370/350 |
| 2002/0181400 A1* | 12/2002 | Zheng et al. | 370/235 |
| 2002/0184373 A1* | 12/2002 | Maes | 709/228 |
| 2002/0196787 A1* | 12/2002 | Rajan et al. | 370/393 |
| 2003/0016630 A1* | 1/2003 | Vega-Garcia et al. | 370/252 |
| 2003/0093550 A1* | 5/2003 | Lebizay et al. | 709/236 |
| 2003/0101217 A1* | 5/2003 | Aiyoshi et al. | 709/203 |
| 2003/0103456 A1* | 6/2003 | Hodgkinson | 370/230 |
| 2003/0118053 A1* | 6/2003 | Edsall et al. | 370/474 |
| 2003/0120802 A1* | 6/2003 | Kohno | 709/237 |
| 2003/0131124 A1* | 7/2003 | Yi et al. | 709/236 |
| 2004/0031054 A1* | 2/2004 | Dankworth et al. | 725/86 |
| 2004/0076277 A1* | 4/2004 | Kuusinen et al. | 379/202.01 |
| 2004/0107294 A1* | 6/2004 | Chen | 709/236 |
| 2004/0128688 A1* | 7/2004 | Seo | 725/62 |
| 2004/0158333 A1* | 8/2004 | Ha et al. | 700/3 |
| 2004/0170182 A1* | 9/2004 | Higashida et al. | 370/401 |
| 2004/0181666 A1* | 9/2004 | Candelore | 713/160 |
| 2004/0202057 A1* | 10/2004 | Ko | 369/30.04 |
| 2004/0202058 A1* | 10/2004 | Ko | 369/30.04 |
| 2004/0202090 A1* | 10/2004 | Ko | 369/124.07 |
| 2004/0212729 A1* | 10/2004 | Yamaguchi et al. | 348/387.1 |
| 2004/0213152 A1* | 10/2004 | Matuoka et al. | 370/230 |
| 2004/0249903 A1* | 12/2004 | Ha et al. | 709/208 |
| 2005/0032514 A1* | 2/2005 | Sadri et al. | 455/423 |
| 2005/0038957 A1* | 2/2005 | Suh | 711/112 |
| 2005/0105429 A1* | 5/2005 | Nagai | 369/53.2 |
| 2005/0160184 A1* | 7/2005 | Walsh et al. | 709/247 |
| 2005/0271072 A1* | 12/2005 | Anderson et al. | 370/419 |
| 2005/0281288 A1* | 12/2005 | Banerjee et al. | 370/477 |
| 2006/0248158 A1* | 11/2006 | Ha et al. | 709/208 |
| 2006/0248228 A1* | 11/2006 | Ha et al. | 709/245 |
| 2006/0291468 A1* | 12/2006 | Bopardikar et al. | 370/392 |
| 2007/0150518 A1* | 6/2007 | Suh | 707/104.1 |
| 2007/0299970 A1* | 12/2007 | Huang et al. | 709/225 |
| 2008/0037540 A1* | 2/2008 | Ngo et al. | 370/392 |
| 2008/0056302 A1* | 3/2008 | Erdal et al. | 370/474 |
| 2008/0140797 A1* | 6/2008 | Ha et al. | 709/208 |
| 2008/0186971 A1* | 8/2008 | Carmichael et al. | 370/392 |
| 2009/0268667 A1* | 10/2009 | Gandham et al. | 370/328 |
| 2010/0067548 A1* | 3/2010 | Song et al. | 370/474 |
| 2010/0135322 A1* | 6/2010 | Choi et al. | 370/473 |
| 2010/0166017 A1* | 7/2010 | Na et al. | 370/474 |
| 2010/0309870 A1* | 12/2010 | Wengerter et al. | 370/329 |
| 2011/0032917 A1* | 2/2011 | Lamy-Bergot et al. | 370/338 |

OTHER PUBLICATIONS

A technical Tutorial on the IEEE 802.11 Protocol by Pablo Brenner Publish/copy right date: 1997 link: http://ssvps.com/~patnaik.girish/MN/pdf/802.11/802_11tut.pdf.*

* cited by examiner

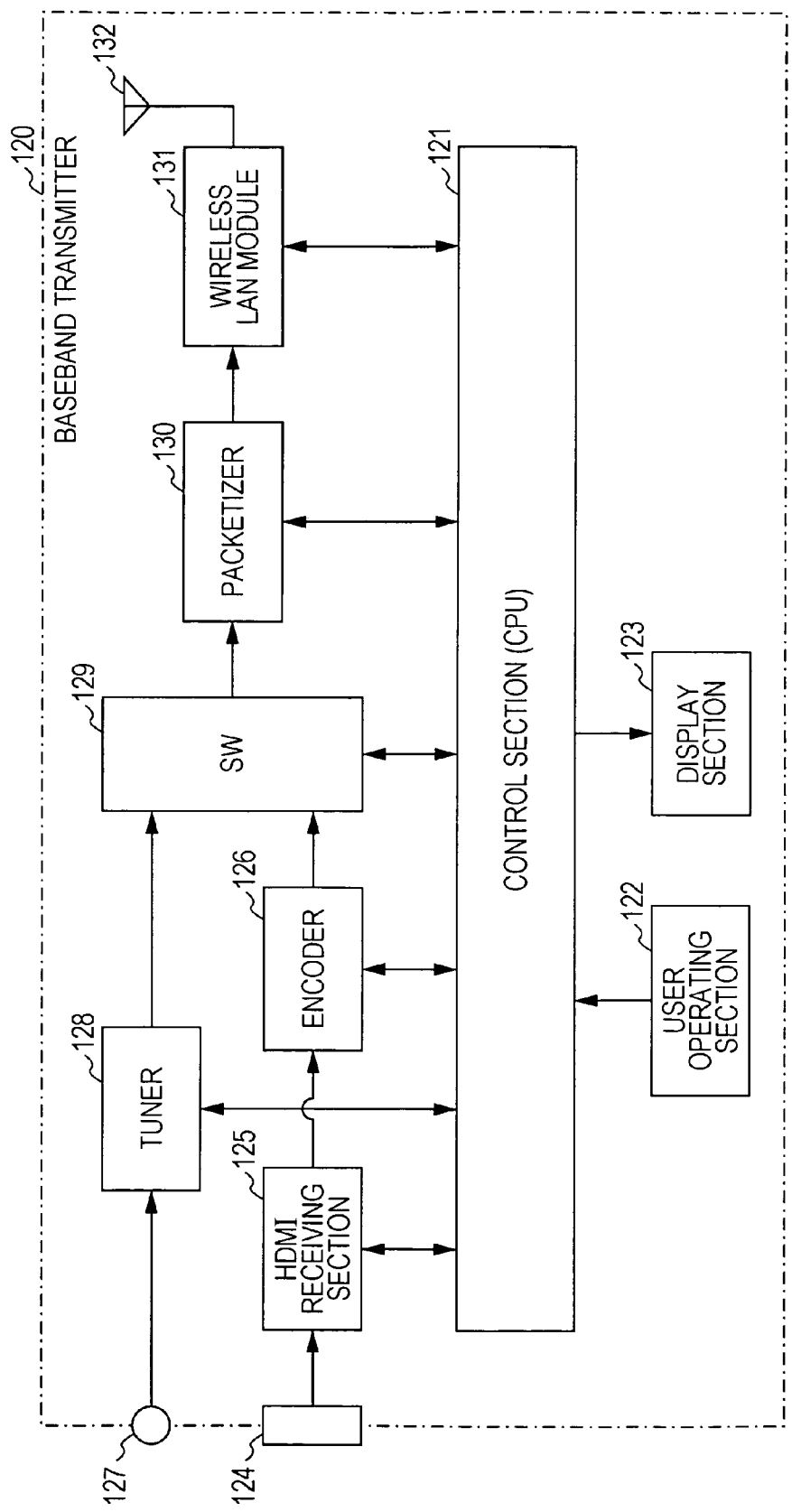

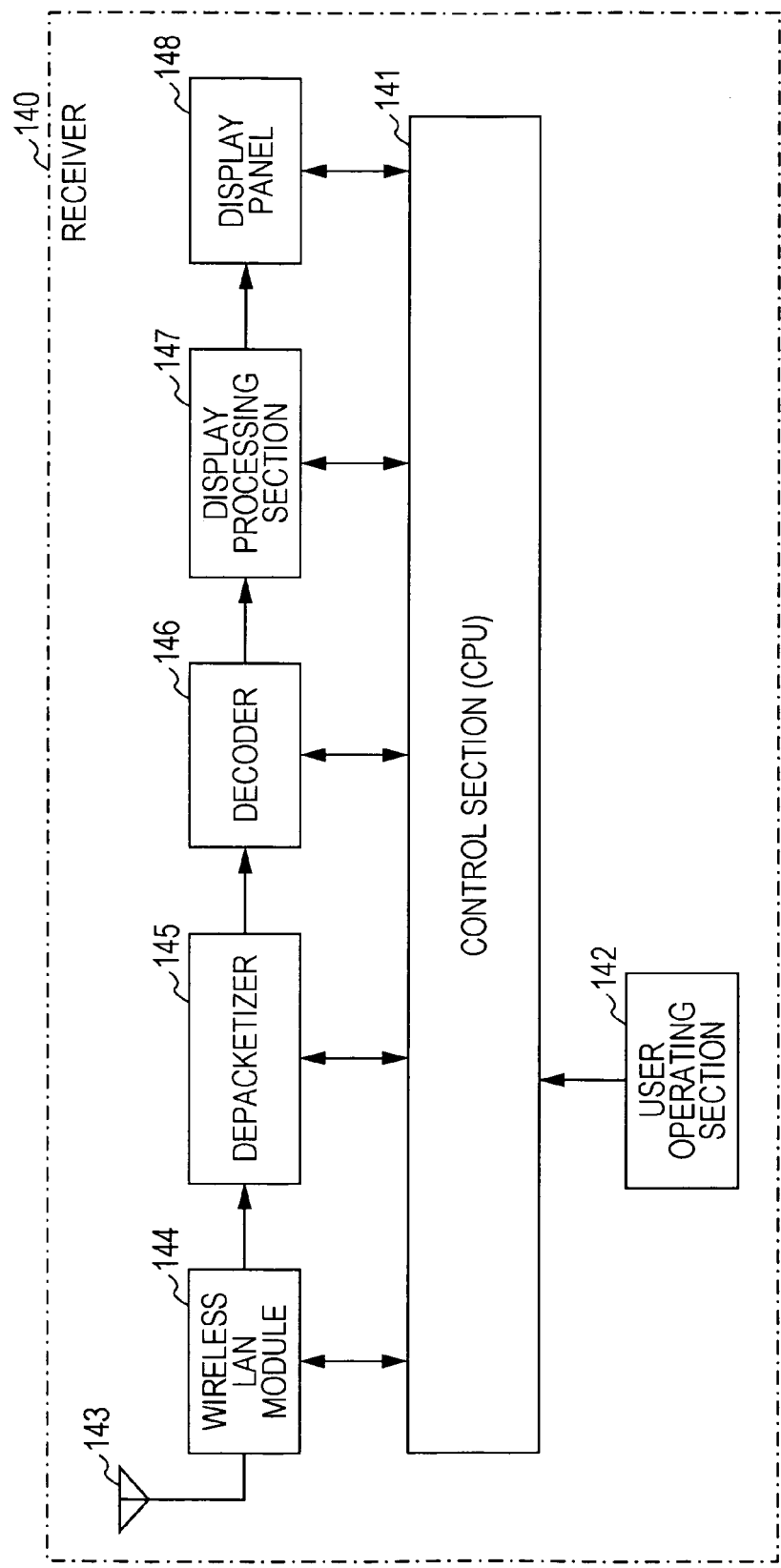

US 8,837,442 B2

WIRELESS TRANSMITTER, WIRELESS TRANSMISSION METHOD, WIRELESS RECEIVER AND WIRELESS RECEPTION METHOD

CROSS-REFERENCE TO RELATED APPLICATION

The present application claims priority from Japanese Patent Application No. JP 2009-101546 filed in the Japanese Patent Office on Apr. 20, 2009, the entire content of which is incorporated herein by reference.

BACKGROUND OF THE INVENTION

1. Field of the Invention

The invention relates to a wireless transmitter, a wireless transmission method, a wireless receiver and a wireless reception method. More particularly, the invention relates to a wireless transmitter which generates and transmits wireless radio signals including a packet with transmitted video signals contained in a payload thereof.

2. Description of the Related Art

With the advent of thin and lightweight television (TV) receiving systems, there is an increasing demand for wall-hanging TVs. Wireless data transmission is necessary for the wall-hanging TVs. At the same time, there is an increasing demand for the Internet Protocol television (IPTV) in which video is delivered across the Internet. There is therefore a demand for wireless local area network (LAN)-enabled TV receiving systems.

In related art wireless data communication TV receiving systems, video signals (i.e., baseband signals) are transmitted as uncompressed data using, for example, the wireless high-definition interface (WHDI) system. In the IPTV, on the other hand, wireless data is transmitted across the Internet based on wireless LAN standards, such as IEEE 802.11a (see, for example, Japanese Unexamined Patent Application Publication No. 2007-49242).

SUMMARY OF THE INVENTION

Baseband signals and wireless LAN signals are transmitted in different formats for wireless data transmission. In order to implement both the different formats for wireless data transmission in a single TV receiving system, the TV receiving system should include receiving modules each dedicated for receiving the baseband signals and the wireless LAN signals or, alternatively, a single receiving module enabled to receive data in both the formats for wireless data transmission. Such receiving module configurations may be provided at high cost.

It is therefore desired to provide a low cost and both network-enabled and baseband-enabled TV receiving system.

According to an embodiment of the invention, there is provided a wireless transmitter which includes a packetizer and a wireless transmitting section.

The packetizer generates a special packet with a payload containing transmitted video signals and a header containing distinguishing information used to distinguish the special packet from an IP packet.

The wireless transmitting section generates and transmits wireless radio signals which contain a special packet generated by the packetizer.

In the present embodiment, a packetizer of a wireless transmitter generates a special packet used in transmission of video signals. The special packet differs from an Internet protocol (IP) packet in, for example, its header structure. The header of the special packet is reduced in size with unnecessary information existing in the header of the IP packet eliminated therefrom. Transmitted video signals are contained in a payload of the special packet. The header of the special packet includes distinguishing information used to distinguish the special packet from the IP packet. A wireless transmitting section of the wireless transmitter generates and transmits wireless radio signals including the special packet generated by the packetizer.

The transmitted video signals contained in the payload of the special packet are, for example, compressed video signals. Since the transmitted video signals have been compressed, the video signals can be transmitted desirably even if a transmission band for the wireless radio signals generated by the wireless transmitting section is not wide enough to transmit the baseband video signals. The header of the special packet includes, for example, compression format information regarding the transmitted video signals. A wireless receiver appropriately decompresses the received video signals on the basis of the compression format information.

The present embodiment may further include, for example, a video signal receiving section and a data compression section. The video signal receiving section receives uncompressed (i.e., baseband) video signals from an external device. The data compression section compresses the video signals received by the video signal receiving section to provide compressed transmitted video signals. The present embodiment may further include, for example, a broadcasting signal processing section for processing broadcasting signals to provide compressed transmitted video signals.

The wireless radio signals generated and transmitted by the wireless transmitting section are wireless LAN signals based on the IEEE 802/11n standard, which is a widely used modulating system for large-volume data communication. The IEEE 802.11n standard is an expanded version of the IEEE 802.11 a/g standard. The IEEE 802.11n standard adopts the OFDM_MIMO communication system using OFDM for primary modulation. With the IEEE 802.11n standard, the signals can be transmitted at a transmission rate of 100 to 600 Mbps. The transmitted video signals are compressed in, for example, the MPEG4-AVC or the MPEG2 format.

As described above, the special packet having the transmitted video signals contained in its payload is generated and the wireless radio signals including the special packet are generated and transmitted. Since the wireless radio signals and the wireless radio signals delivered on a network, e.g., wireless LAN signals, are modulated in a single common modulating system, a single receiving module can be employed in the wireless receiver to receive both the wireless radio signals delivered on a network and the wireless baseband signals.

A special packet is used for wireless transmission of the baseband data. The special packet differs from an IP packet in, for example, a smaller-sized header. The special packet includes distinguishing information in the header thereof representing that the special packet is different from the IP packet. With this configuration, the wireless receiver can process the header of the special packet in a different manner from that of the IP packet on the basis of the distinguishing information. Thus, depacketization can be completed in a shorter time and thus transmission delay of the baseband data can be reduced.

According to another embodiment of the invention, there is provided a wireless receiver which includes a wireless receiving section, a depacketizer, a packet distinguishing section and a depacketization control section. The wireless receiving section receives wireless radio signals having a packet with video signals included in a payload and obtaining a packet from the wireless radio signals.

The depacketizer processes the packet obtained in the wireless receiving section to provide received video signals. The packet distinguishing section distinguishes the packet obtained by the wireless receiving section between a special packet and an IP packet by determining whether a header of the packet of interest has distinguishing information for distinguishing the packet of interest from the IP packet.

The depacketization control section controls a process of the depacketizer in accordance with the distinguishing result of the packet distinguishing section.

In the present embodiment, the wireless receiving section receives wireless radio signals including a packet in which the video signals are contained in the payload. The packet is obtained from the wireless radio signals. The depacketizer processes the packet obtained by the wireless receiving section to provide received video signals. The packet obtained by the wireless receiving section is an IP packet or a special packet that is different from the IP packet. The special packet differs from the IP packet in, for example, its header structure. The header of the special packet is reduced in size with unnecessary information existing in the header of the IP packet eliminated therefrom.

A packet distinguishing section distinguishes between the special packet and the IP packet by detecting distinguishing information for distinguishing the special packet from the IP packet contained in the header of the specific packet. A depacketization control section controls operation of the depacketizer on the basis of the distinguishing result.

If, for example, the video signals contained in the payload of the packet have been compressed, the depacketizer decompresses the obtained received video signals to provide uncompressed (i.e., baseband) video signals.

The header of the special packet includes, for example, compression format information regarding the video signals. If the packet obtained in the wireless receiving section is a special packet, decompression by a data decompression section is controlled on the basis of the compression format information included in the header of the special packet. The data decompression section decompresses the data appropriately on the basis of the compression format information so that the received video signals are decompressed appropriately.

The wireless radio signals received by the wireless receiving section are, for example, wireless LAN signals based on the IEEE 802/11n standard, which is a widely used modulating system for large-volume data communication. The video signals contained in the payload of the special packet are compressed in, for example, the MPEG4-AVC or the MPEG2 format.

As described above, the packet obtained in the wireless receiving section is distinguished between the special packet and the IP packet and the operation of the depacketizer is controlled on the basis of the distinguishing result. If the packet obtained in the wireless receiving section is a special packet, the header of the special packet is processed in a different manner from that of the IP packet. Thus, depacketization can be completed in a shorter time and thus transmission delay of the baseband data can be reduced.

According to the wireless transmitter of the present embodiment, the special packet having the transmitted video signals contained in its payload is generated and the wireless radio signals including the special packet are generated and transmitted. Since the wireless radio signals and the wireless radio signals delivered on a network, e.g., wireless LAN signals, are modulated in a single common modulating system, a single receiving module can be employed in the wireless receiver to receive both the wireless radio signals delivered on a network and the wireless baseband signals. Such a configuration can be provided at a lower cost.

According to the wireless transmitter of the present embodiment, a special packet is used for wireless transmission of the baseband data. The special packet differs from an IP packet in, for example, a smaller-sized header. The special packet includes distinguishing information in the header thereof representing that the special packet is different from the IP packet. With this configuration, the wireless receiver can process the header of the special packet in a different manner from that of the IP packet on the basis of the distinguishing information. Thus, depacketization can be completed at a higher speed and transmission delay can be reduced.

According to the wireless receiver of the present embodiment, the packet obtained in the wireless receiving section is distinguished between the special packet and the IP packet and operation of the depacketizer is controlled on the basis of the distinguishing result. If the packet obtained in the wireless receiving section is a special packet, the header of the special packet is automatically processed in a manner dedicated for the special packet. Thus, depacketization can be completed at a higher speed and transmission delay can be reduced.

BRIEF DESCRIPTION OF THE DRAWINGS

FIG. 4 is a block diagram of an exemplary structure of a baseband transmitter as a component of the TV receiving system; and FIG. 5 is a block diagram of an exemplary structure of a receiver as a component of the TV receiving system.

DESCRIPTION OF THE PREFERRED EMBODIMENTS

Hereinafter, preferred embodiments (hereinafter, referred to as "embodiments") of the invention will be described. Description will be given in the following order.

1. Embodiment
2. Modified Embodiment

1. Embodiment

Structure of TV Receiving System

Figure 1:
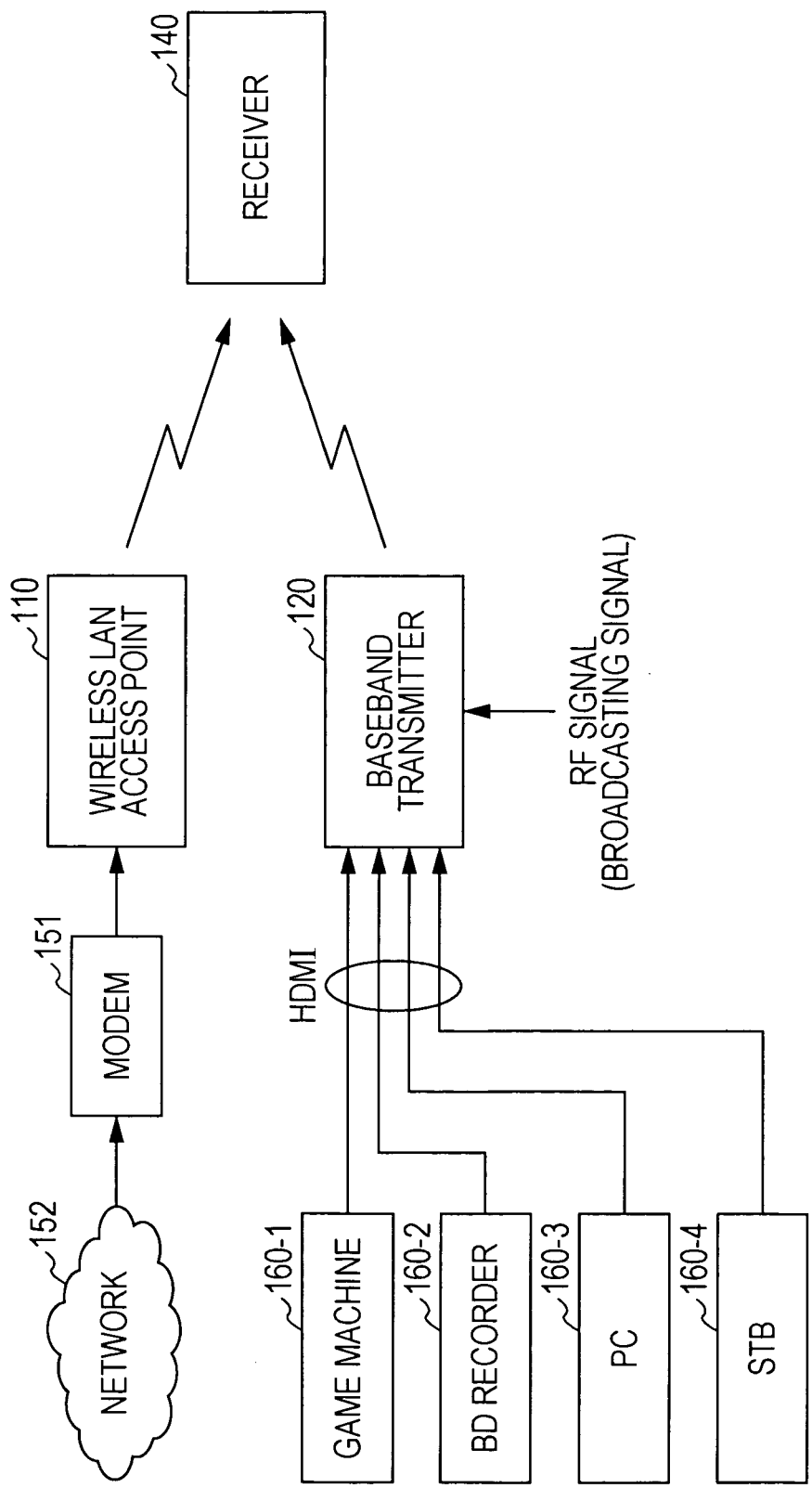
FIG. 1 is a block diagram of an exemplary structure of a TV receiving system according to an embodiment of the invention.

FIG. 1 illustrates an exemplary structure of a TV receiving system 100 according to an embodiment of the invention. The TV receiving system 100 includes a wireless local area network (LAN) access point 110, a baseband receiver 120 and a receiver 140.

The wireless LAN access point 110 transmits wireless radio signals delivered on a network. The wireless LAN access point 110 is connected to a network 152, such as the Internet, via a modem 151.

An Internet protocol (IP) packet is sent to the wireless LAN access point 110 via the network 152 and the modem 151 from a distribution server of an Internet protocol television (IPTV) broadcaster, which is not illustrated.

Figure 2:
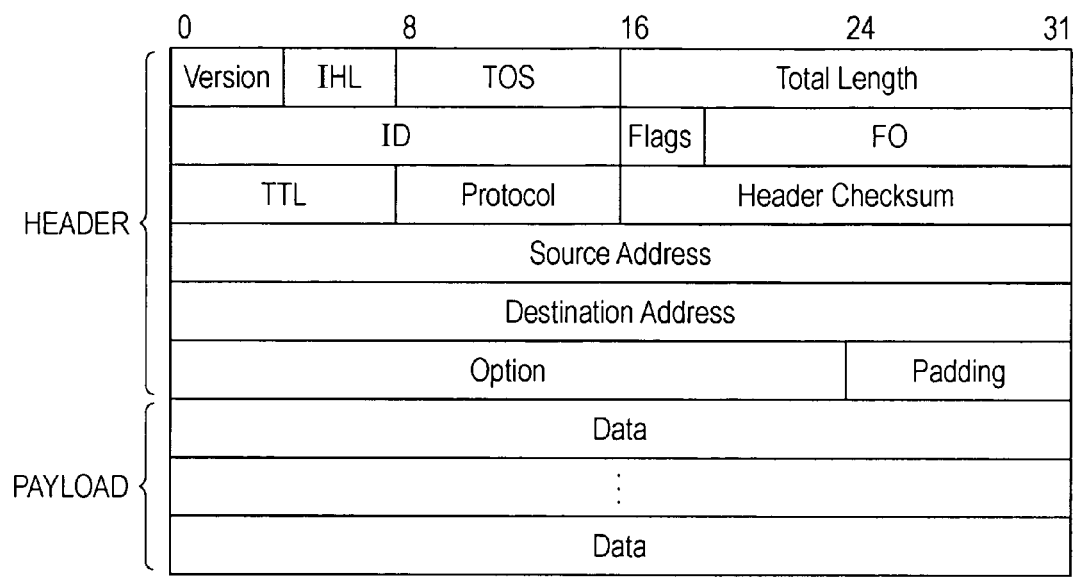
FIG. 2 illustrates a structure of an IP packet.

FIG. 2 illustrates a structure of an IP packet. The IP packet is composed of a header and payload. The IP packet illustrated in FIG. 2 is delimited at each 32 bits. A Version field is 4 bits in width. The Version field represents a version of an IP protocol. Currently, the most widely used IP protocol version is version 4 (IPv4), which is now being replaced by version 6 (IPv6). An Internet header length (IHL) field is 4 bits in width. The IHL field represents the size of an IP header (i.e., a fixed length section and an optional section).

A Type of service (TOS) field is 8 bits in width. The TOS field represents the quality of the IP service. In particular, the TOS field represents, for example, priority, short delay requests, high throughput requests and high reliability requests. A Total Length field is 16 bits in width. The Total Length field represents the total size (octet) of the IP packet.

An identification (ID) field is 16 bits in width. A numerical value for distinguishing the IP packet used in IP fragmentation is added to the ID field. A Flags field is 3 bits in width. Information about packet control is added to the Flags field. In particular, information regarding whether or not the packet of interest is the last packet, whether or not there are following packet(s) or whether or not the packet of interest can be divided.

A fragment offset (FO) field is 13 bits in width. A sequence number representing the order of divided IP packet is added to the FO field. A time to live (TTL) field is 8 bits in width. The TTL field is a numeric field representing time during which the IP packet lives in the network.

A Protocol field is 8 bits in width. The protocol field represents a protocol of a higher, transport layer. A Header Checksum field is 16 bits in width. The Header Checksum field represents checksum (i.e., data for checking consistency) of a header.

A Source Address field is 32 bits in width. The Source Address field represents an IP address of the source. A Destination Address field is 32 bits in width. The Destination Address field represents an IP address of the destination. Routing is conducted on the basis of the destination address and the IP packet is sent to the destination.

An Option field has a variable length. The Option field is used to implement various additional functions during transmission of the IP packet. A Padding field is used for adjustment of the header length. If the header length is not a multiple of 32 bits, the header length is adjusted by padding with 0 in a Padding field.

A Data field is a field in which data (i.e., a payload) delivered as an IP packet is contained. In the IPTV, the video signals contained in the payload (i.e., the Data field) of the IP packet are compressed video signals. The video signals are compressed in, for example, the MPEG4-AVC format.

Referring again to FIG. 1, the wireless LAN access point 110 generates wireless radio signals including the foregoing IP packet supplied from the modem 151 and transmits the same to the receiver 140. In the present embodiment, the wireless LAN access point 110 generates the wireless LAN signals based on IEEE 802.11n standard. Although not described in detail, the IEEE 802.11n standard is an expanded version of the IEEE 802.11 a/g standard. The IEEE 802.11n standard adopts the OFDM_MIMO communication system using OFDM for primary modulation. With the IEEE 802.11n standard, the signals can be transmitted at a transmission rate of 100 to 600 Mbps.

The baseband transmitter 120 transmits wireless baseband signals. An external device is connected to the baseband transmitter 120 through High-Definition Multimedia Interface (HDMI) to supply baseband (i.e., uncompressed) video signals to the baseband transmitter 120. Examples of the external device include a game machine 160-1, a Blu-ray disc (BD) recorder 160-2, a personal computer (PC) 160-3 and a Set-Top Box (STB) 160-4. RF signals are supplied to the baseband transmitter 120 as digital broadcasting signals caught by an unillustrated antenna.

The baseband transmitter 120 generates a special packet. The special packet differs from the IP packet in its header structure. The header of the special packet is reduced in size with unnecessary information existing in the header of the IP packet eliminated therefrom. The header of the special packet includes distinguishing information used to distinguish the special packet from the IP packet. Compressed video signals are contained in the payload of the special packet as described later. Compression format information regarding the video signal is contained in the header of the special packet.

The compressed video signals are contained in the payload of the special packet. In particular, when the video signals are sent to the receiver 140 from an external device, the baseband (i.e., uncompressed) video signals supplied from the external device are compressed in the above-described manner. The video signals are compressed in, for example, the MPEG4-AVC format. The compressed video signals are thus contained in the payload of the special packet.

If, on the other hand, the video signals relating to broadcasting signals are transmitted to the receiver 140, a tuner (i.e., a broadcasting signal processing section) provides video signals compressed in, for example, the MPEG4-AVC or MPEG2 format. In this case, the compressed video signals transmitted by the tuner are contained in the payload of the special packet.

Figure 3:
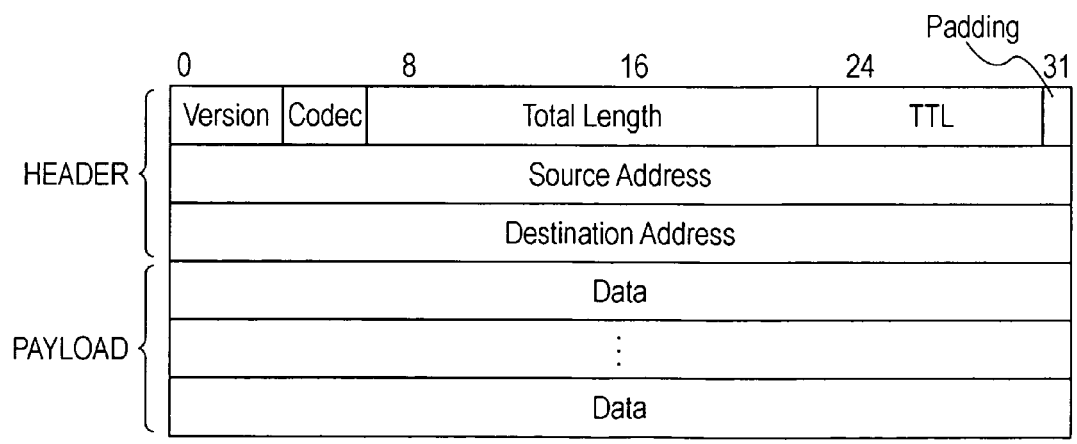
FIG. 3 illustrates an exemplary structure of a special packet.

FIG. 3 illustrates an exemplary structure of a special packet. Similar to the IP packet (see FIG. 2), the special packet is composed by a header and a payload. The special packet is delimited at each 32 bits.

A Version field is 4 bits in width. The Version field has distinguishing information representing that the packet of interest is not an IP packet. In the IP packet described above, a value of 4 (0010 in binary digit) representing the version 4 and a value of 6 (0110 in binary digit) representing the version 6 are disposed in the Version field. Values that will not be used in the IP packet, e.g., 0 to 3, are disposed in the Version field of the special packet.

A Codec field is 3 bits in width. Compression format information representing a compression format of the compressed video signals contained in the payload is disposed in the Codec field. A Total Length field is 16 bits in width. The Total Length field represents the total size (octet) of the special packet.

A time to live (TTL)" field is 8 bits in width. The TTL field is a numeric field representing time during which the IP packet lives in the network. A Source A field is 32 bits in width. The Source Address field represents an IP address of the source. A Destination Address field is 32 bits in width. The Destination Address field represents an IP address of the destination.

A Data field is a field in which data (i.e., a payload) delivered as an IP packet is contained. As described above, video signals supplied from an external device or video signals obtained through processing of broadcasting signals (i.e., RF signals) are contained in the Data field.

The baseband transmitter 120 generates wireless radio signals including the special packet described above and transmits the same to the receiver 140. The wireless radio signals are modulated in the same manner as in the wireless radio signals generated by the wireless LAN access point 110 described above. In particular, in the present embodiment, the baseband transmitter 120 generates wireless LAN signals based on the IEEE 802.11n standard in the same manner as in the wireless LAN access point 110 described above.

Thus, the wireless radio signals generated in the baseband transmitter 120 are modulated in the same manner as in the wireless radio signals generated in the wireless LAN access point 110 described above. Accordingly, a single receiving module can be employed in the receiver 140 to receive both the wireless radio signals delivered on a network and the wireless baseband signals.

The receiver 140 receives the wireless radio signals, i.e., the wireless LAN signals based on the IEEE 802.11n standard, transmitted from the wireless LAN access point 110 or the baseband transmitter 120. The receiver 140 depacketizes the packet (i.e., the IP packet or the special packet) obtained from the wireless LAN signals so as to provide received video signals. The receiver 140 decompresses the received video signals to provide baseband (i.e., uncompressed) video signals.

As described above, distinguishing information used to distinguish the packet of interest from the IP packet contained in the Version field of the header of the special packet included in the wireless LAN signals fed from the baseband transmitter 120. Accordingly, the receiver 140 can distinguish the packet obtained from the received wireless LAN signals between the IP packet and the special packet on the basis of the distinguishing information.

The receiver 140 can process the header of the IP packet and the header of the special packet in different manners during depacketization. As described above, since the header of the special packet is reduced in size as compared to the IP packet, the special packet obtained from the received wireless LAN signals can be processed at a higher rate as compared to the IP packet.

In the receiver 140, if the packet obtained from the received wireless LAN signals is the special packet, compression format information regarding the video signals is included in the header of that special packet. Accordingly, the received video signals are decompressed appropriately on the basis of the compression format information.

Exemplary Structures of Baseband Transmitter and Receiver

FIG. 4 illustrates an exemplary structure of the baseband transmitter 120. The baseband transmitter 120 includes a control section 121, a user operating section 122 and a display section 123. The baseband transmitter 120 further includes a HDMI terminal 124, a HDMI receiving section 125 and an encoder 126. The baseband transmitter 120 includes an antenna terminal 127, a tuner 128, a switch section 129, a packetizer 130, a wireless LAN module 131 and a transmission antenna 132.

The control section 121 includes a central processing unit (CPU) and controls operations of the components of the baseband transmitter 120. The user operating section 122 and the display section 123 constitute a user interface and are connected to the control section 121. The user operating section 122 includes, for example, a key, button and a dial disposed on an unillustrated housing of the baseband transmitter 120 or a touch panel disposed on a display surface of the display section 123. The display section 123 includes a display panel, such as a liquid crystal display (LCD).

The HDMI receiving section 125 is connected to the HDMI terminal 124. The HDMI receiving section 125 receives baseband (i.e., uncompressed) video signals transmitted unidirectionally from an external device, such as a game machine 160-1, connected via an unillustrated HDMI cable based on the HDMI communication system. The HDMI terminal 124 and the HDMI receiving section 125 constitute the video signal receiving section.

The encoder 126 compresses the video signals received by the HDMI receiving section 125 to provide compressed transmitted video signals. The transmitted video signals herein are compressed based on a predetermined compression format, such as the MPEG4-AVC format, with desired efficiency in encoding. In the MPEG4-AVC format, data is encoded in a block unit. In the MPEG4-AVC format, inter-frame redundancy is eliminated by computing the prediction residual with motion thereof being compensated in a block unit. In the MPEG4-AVC format, inter-frame redundancy is eliminated through orthogonal transformation and variable length coding in a block unit along a space axis. The encoder 126 constitutes the data compression section.

The tuner 128 processes digital broadcasting signals captured by an unillustrated antenna connected to the antenna terminal 127 to provide video signals of certain programs. The video signals are compressed in the MPEG2 or MPEG4-AVC format. The tuner 126 constitutes the broadcasting signal processing section.

The switch section 129 selectively takes out the video signals obtained by the encoder 126 or the video signals obtained by the tuner 128 as transmitted video signals. The switch section 129 is controlled by the control section 121 on the basis of user selection on the user operating section 122.

The packetizer 130 generates the special packet (see FIG. 3) described above. The special packet has a value of 0 to 3 stored in the Version field and thus can be distinguished as a packet different from the IP packet. The packetizer 130 disposes video signals taken out by the switch section 129 in the payload of the special packet.

The packetizer 130 stores compression format information representing the compression format used to compress the video signals taken out by the switch section 129 in the Codec field provided in the header of the special packet. If the video signals are compressed in, for example, the MPEG4-AVC format, the compression format information represents the MPEG4-AVC format. If the video signals are compressed in, for example, the MPEG2 format, the compression format information represents MPEG2 format.

The wireless LAN module 131 includes a transmitting section and a receiving section for transmitting and receiving signals based on a predetermined communication protocol. The wireless module 131 transmits or receives the signals based on a wireless LAN format, such as the IEEE 802.11n standard. The wireless LAN module 131 generates the wireless LAN signals including a special packet generated by the packetizer 130 and transmits the signals to the receiver 140 via the antenna 132. The wireless LAN module 131 constitutes the wireless transmitting section.

The transmitting operation of the baseband transmitter 120 illustrated in FIG. 4 will be described below.

The baseband (i.e., uncompressed) video signals supplied from an external device, such as a game machine 160-1, via a HDMI cable are received by the HDMI receiving section 125 and are supplied to the encoder 126. The encoder 126 compresses the baseband video signals in, for example, the MPEG4-AVC compression format. The compressed video signals obtained by the encoder 126 are supplied to the switch section 129.

Digital broadcasting signals (i.e., RF signals) captured by an unillustrated antenna are supplied to the tuner 128 from the antenna terminal 127. In the tuner 128, the digital broadcasting signals are processed to provide video signals of a predetermined program in accordance with user channel selection. The video signals are compressed in, for example, MPEG2 or MPEG4-AVC compression format. The compressed video signals obtained by the tuner 128 are supplied to the switch section 129.

The switch section 129 selectively takes out the video signals obtained by the encoder 126 output from an external device or the broadcasting video signals obtained by the tuner 126 as transmitted video signals in accordance with user selection. The video signals taken out by the switch section 129 are supplied to the packetizer 130.

In the packetizer 130, the compressed video signals supplied from the switch section 129 are placed in the payload, and the special packet (see FIG. 3) with the packet distinguishing information and the compression format information included in the header is generated. The special packet generated by the packetizer 130 is then supplied to the wireless LAN module 131.

The wireless LAN module 131 transmits the special packet based on a predetermined communication protocol. In particular, the wireless LAN module 131 generates the wireless LAN signals including a special packet based on, for example, the IEEE 802.11n standard and then transmits the signals via the antenna 132.

FIG. 5 illustrates an exemplary structure of the receiver 140. The receiver 140 includes a control section 141 and a user operating section 142. The receiver 140 further includes an antenna 143, a wireless LAN module 144, a depacketizer 145, a decoder 146, a display processing section 147 and a display panel 148.

The control section 141 includes a central processing unit (CPU), which controls operations of the components of the receiver 140. The user operating section 142 constitutes a user interface and is connected to the control section 141. The user operating section 142 includes, for example, a key, button and a dial disposed on an unillustrated housing of the receiver 140 or a remote controller.

The wireless LAN module 144 includes a transmitting section and a receiving section for transmitting and receiving signals based on a predetermined communication protocol. The wireless module 144 transmits or receives the signals based on a wireless LAN format, such as the IEEE 802.11n standard. The wireless LAN module 144 receives the wireless LAN signals transmitted from the wireless LAN access point 110 or the baseband transmitter 120 via the antenna 143.

The wireless LAN module 144 obtains a packet included in the received wireless LAN signal and having the video signals in the payload. The packet is an IP packet (see FIG. 2) if the received wireless LAN signals are sent from the wireless LAN access point 110. The packet is a special packet (see FIG. 3), if the received wireless LAN signals are sent from the baseband transmitter 120. The wireless LAN module 144 constitutes the wireless receiving section.

The depacketizer 145 depacketizes the packet obtained in the wireless LAN module 144 to provide received video signals. The control section 141 distinguishes the packet obtained by the wireless LAN module 144 between the IP packet or the special packet on the basis of a value (i.e., distinguishing information) of the Version field in the leading byte of the header of the packet. The control section 141 controls the operations of the depacketizer 145 for the IP packet or for the special packet in different manners on the basis of the distinguishing result. The control section 141 constitutes the packet distinguishing section and the depacketization control section.

Here, the depacketizer 145 depacketizes the IP packet and the special packet in different manners. As described above, since the header of the special packet is reduced in size as compared to the IP packet, if the packet obtained from the received wireless LAN signals is a special packet, the header can be processed at a higher speed than in the process of the IP packet.

The decoder 146 decompresses the received video signals obtained by the depacketizer 145 to provide baseband (i.e., uncompressed) video signals. The control section 141 obtains compression format information included in the Codec field when the packet obtained by the wireless LAN module 144 is a special packet. The control section 141 controls the operation of the decoder 146 on the basis of the type of the packet, i.e., the IP packet or the special packet, and on the basis of obtained compression format information if the packet is a special packet. The decoder 146 constitutes the data decompression section.

In particular, when the packet obtained by the wireless LAN module 144 is an IP packet, the decoder 146 decompresses the packet in a predetermined compression format, such as MPEG4-AVC. If, on the other hand, the packet obtained by the wireless LAN module 144 is a special packet, the decoder 146 decompresses the packet in accordance with the compression format represented by the compression format information. Thus, the packet is decompressed appropriately.

The display processing section 147 provides the video signals obtained by the decoder 146 with processes including color adjustment, edge enhancement and superposition of graphic data. The display panel 148 displays an image of the video signals processed by the display processing section 147. The display panel 148 may, for example, be a liquid crystal display (LCD), an organic electroluminescence panel and a plasma display panel (PDP).

A receiving operation of the receiver 140 illustrated in FIG. 5 will be described. The wireless LAN signals transmitted from the wireless LAN access point 110 or the baseband transmitter 120 are received by the wireless LAN module 144 via the antenna 143. The wireless LAN module 144 obtains the packet (the IP packet or the special packet) included in the received wireless LAN signals. The packet is supplied to the depacketizer 145.

The depacketizer 145 depacketizes the packet obtained by the wireless LAN module 144 to provide received video signals. As described above, since the video signals included in the payload of the IP packet or the payload of the special packet are the compressed video signals, the received video signals are also the compressed video signals.

The value in the Version field in the leading byte of the header of the packet obtained by the wireless LAN module 144 is 4 or 6 for the IP packet and is any of 0 to 3 for the special packet. The control section 141 distinguishes the packet between an IP packet sent from the wireless access point 110 and a special packet sent from the baseband transmitter 120 on the basis of the value of the Version field as the distinguishing information.

The control section 141 controls the operation of the depacketizer 145 on the basis of the distinguishing result. In particular, since the IP packet and the special packet have different header structures as described above, the headers are processed in different manners. As described above, since the header of the special packet is reduced in size as compared to the IP packet, the header can be processed in a shorter time than in the IP packet. Thus, delay due to depacketization by the depacketizer 145 can be reduced as compared to the IP packet.

The received video signals obtained by the depacketizer 145 are supplied to the decoder 146. The decoder 146 decompresses the video signals to provide baseband (i.e., uncompressed) video signals. If the packet obtained by the wireless LAN module 144 is a special packet, the compression format information representing the compression format of the video signals included in the payload of the special packet is disposed in the Codec field which follows the Version field in the header. Thus, the control section 141 recognizes the compression format applied to the received video signals obtained by the depacketizer 145 on the basis of the compression format information included in the Codec field.

The control section 141 controls the data decompression process of the decoder 146 on the basis of the distinguishing result of the packet and the recognition result regarding the compression format. In particular, when the packet obtained by the wireless LAN module 144 is an IP packet, the decoder 146 decompresses the received video signals in a predetermined compression format, such as MPEG4-AVC. If, on the other hand, the packet obtained by the wireless LAN module 144 is a special packet, the decoder 146 decompresses the received video signals in accordance with the compression format represented by the compression format information. Thus, the video signals are decompressed appropriately.

The baseband (i.e., uncompressed) video signals obtained by the decoder 146 are supplied to the display processing section 147. The display processing section 147 provides the video signals with processes including color adjustment, edge enhancement and superposition of graphic data in accordance with the user operation or otherwise automatically. The video signals processed by the display processing section 147 are then supplied to the display panel 148, on which an image in accordance with the received video signals is displayed.

As described above, in the TV receiving system 100 illustrated in FIG. 1, the wireless radio signals transmitted to the receiver 140 from the database transmitter 120 are modulated in the same manner as in the wireless radio signals transmitted to the receiver 140 from the wireless LAN access point 110. In particular, the wireless radio signals transmitted to the receiver 140 from the database transmitter 120 are the wireless LAN signals based on the IEEE 802.11n standard, for example. Thus, in the receiver 140, a single wireless receiving module (i.e., the wireless LAN module 144) can receive both the wireless radio signals delivered on a network and the wireless baseband signals. Accordingly, a simply structured and thus low cost receiver 140 can be provided.

In the TV receiving system 100 illustrated in FIG. 1, the baseband transmitter 120 generates a special packet having the transmitted video signals included in the payload. The wireless radio signals including the special packet are transmitted to the receiver 140. The special packet has a header of reduced size as compared to that of the IP packet. The special packet can be distinguished from the IP packet on the basis of the value contained in the Version field. Accordingly, the receiver 140 automatically distinguishes the special packet from the IP packet. Thus, the header of the special packet can be processed in a different manner than that of the IP packet and the depacketization can be completed in a shorter time than in the IP packet. As a result, transmission delay of wireless baseband signals can be reduced.

In the TV receiving system 100 illustrated in FIG. 1, the baseband transmitter 120 generates a special packet having the transmitted video signals included in the payload. The wireless radio signals including the special packet are transmitted to the receiver 140. The Codec field is provided in the payload of the special packet. The compression format information representing the compression format applied to the video signals is contained in the Codec field. In the receiver 140, if the packet obtained by the wireless LAN module 144 is a special packet, the decoder 146 decompresses the special packet in an appropriate manner on the basis of the compression format information. Thus, the received video signals can be decompressed appropriately.

2. Modified Embodiment

The structure of the special packet generated by the database transmitter 120 in the embodiment described above is not limited to that illustrated in FIG. 3. Other structures of the special packet may also be employed. It is only necessary that the payload is reduced in size to exclude unnecessary information and the distinguishing information representing that the packet of interest is not an IP packet is included in the payload. If the video signals included in the payload are compressed in a fixed manner, it is not necessary to provide the compression format information in the header of the special packet.

In the embodiment described above, the receiver 140 distinguishes between the IP packet sent from the wireless LAN access point 110 and the special packet sent from the baseband transmitter 120 and automatically selects header processing in the depacketizing process of the depacketizer 145. Although not illustrated, the receiver 140 may alternatively have a function to limit receiving so that any one of the IP packet and the special packet can be received on the basis of the distinguishing result.

In the embodiment described above, although the baseband (i.e., uncompressed) video signals are supplied to the baseband transmitter 120 from the external device, such as the game machine 160-1, the baseband transmitter 120 may alternatively be provided integrally with the game machine 160-1.

Although not illustrated, the baseband transmitter 120 may generate in time division a special packet having the video signals sent from plural external devices included in the payload and transmit the generated special packet to the receiver 140. In that case, the header of the special packet may have a field for containing information used to distinguish the external device. The receiver 140 may selectively receive the video signals from the external device on the basis of the distinguishing information.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless transmitter comprising:

a packetizer which generates a special packet with a payload containing transmitted video signals and a header containing distinguishing information used to distinguish the special packet from an IP packet; and a wireless transmitting section for generating and transmitting wireless radio signals which contain a special packet generated by the packetizer, wherein the distinguishing information comprises a version field having a plurality of bits, the version field of the special packet has a same number of bits as a version field of an IP packet, and a pattern of bits of the version field for the special packet is different from a pattern of bits of the version field for an IP packet, wherein the pattern of bits of the version field for the special packet does not indicate a version of an IP protocol and is selectively variable among a plurality of predetermined patterns of bits, and wherein the header of the special packet is smaller than a header of the IP packet, and the special packet and the IP packet are distinct such that the special packet is not included within the IP packet and the IP packet is not included within the special packet.

2. The wireless transmitter according to claim 1, wherein the transmitted video signals are compressed video signals and compression format information regarding the transmitted video signals is included in a header of the special packet generated by the packetizer.

3. The wireless transmitter according to claim 2, wherein wireless radio signals generated and transmitted by the wireless transmitting section are wireless LAN signals based on an IEEE 802/11 n standard.

4. The wireless transmitter according to claim 3, wherein the transmitted video signals are compressed based on a MPEG4-AVC or MPEG2 format.

5. The wireless transmitter according to claim 2, further comprising:
a video signal receiving section for receiving uncompressed video signals from an external device; and
a data compression section for compressing the uncompressed video signals received by the video signal receiving section to provide compressed transmitted video signals.

6. The wireless transmitter according to claim 2, further comprising a broadcasting signal processing section for processing broadcasting signals to provide compressed transmitted video signals.

7. A wireless transmission method, comprising the steps of:
packetizing signals by generating a special packet having transmitted video signals included in a payload and having distinguishing information included in a header for distinguishing the special packet from an IP packet; and
wirelessly transmitting signals by generating and transmitting wireless radio signals including the special packet generated in the step of packetizing,
wherein the distinguishing information comprises a version field having a plurality of bits, the version field of the special packet has a same number of bits as a version field of an IP packet, and a pattern of bits of the version field for the special packet is different from a pattern of bits of the version field for an IP packet,
wherein the pattern of bits of the version field for the special packet does not indicate a version of an IP protocol and is selectively variable among a plurality of predetermined patterns of bits, and
wherein the header of the special packet is smaller than a header of the IP packet, and the special packet and the IP packet are distinct such that the special packet is not included within the IP packet and the IP packet is not included within the special packet.

8. A wireless receiver, comprising:
a wireless receiving section for receiving wireless radio signals having a packet with video signals included in a payload and obtaining a packet from the wireless radio signals;
a depacketizer for processing the packet obtained in the wireless receiving section to provide received video signals;
a packet distinguishing section which distinguishes the packet obtained by the wireless receiving section between a special packet or an IP packet by determining whether a header of a packet of interest has distinguishing information for distinguishing the packet of interest from the IP packet; and
a depacketization control section for controlling a process of the depacketizer in accordance with a distinguishing result of the packet distinguishing section,
wherein the distinguishing information comprises a version field having a plurality of bits, a version field of the packet of interest has a same number of bits as a version field of the IP packet, and a pattern of bits of the version field for the packet of interest is different from a pattern of bits of the version field for the IP packet,
wherein a pattern of bits of the version field for the special packet does not indicate a version of an IP protocol and is selectively variable among a plurality of predetermined patterns of bits, and wherein the header of the special packet is smaller than a header of the IP packet, and the special packet and the IP packet are distinct such that the special packet is not included within the IP packet and the IP packet is not included within the special packet.

9. The wireless receiver according to claim 8, in which the video signals contained in the payload of the packet are compressed video signals and compression format information regarding the video signals are contained in the header of the special packet, the wireless receiver further comprising:
a data decompression section for decompressing the received video signals obtained in the depacketizer to provide uncompressed video signals; and
a data decompression control section for controlling a data decompression process of the data decompression section based on the compression format information included in a header of the special packet if the packet obtained in the wireless receiving section is the special packet based on an identification result of the packet identification section.

10. The wireless receiver according to claim 9, wherein wireless radio signals received by the wireless receiving section are wireless LAN signals based on an IEEE 802/11n standard.

11. The wireless receiver according to claim 10, wherein the video signals contained in the payload of the special packet are compressed based on a MPEG4-AVC or MPEG2 format.

12. A wireless reception method, comprising the steps of:
receiving wireless radio signals including a packet with video signals contained in a payload to provide a packet from the wireless radio signals;
depacketizing the packet received in the step of receiving the wireless radio signals to provide received video signals;
distinguishing the packet received in the step of receiving the wireless radio signals between a special packet and an IP packet by determining whether a header of a packet of interest has distinguishing information for distinguishing the packet of interest from the IP packet; and
controlling the depacketizing step in accordance with a distinguishing result of the distinguishing step,
wherein the distinguishing information comprises a version field having a plurality of bits, a version field of the packet of interest has a same number of bits as a version field of the IP packet, and a pattern of bits of the version field for the packet of interest is different from a pattern of bits of the version field for the IP packet,
wherein a pattern of bits of the version field for the special packet does not indicate a version of an IP protocol and is selectively variable among a plurality of predetermined patterns of bits, and
wherein a header of the special packet is smaller than a header of the IP packet, and the special packet and the IP packet are distinct such that the special packet is not included within the IP packet and the IP packet is not included within the special packet.

* * * * *